No. 851,582. PATENTED APR. 23, 1907.
P. YOE.
VOTING MACHINE.
APPLICATION FILED NOV. 16, 1905.

Witnesses
Matthew Siebler
C. M. Theobald.

Inventor
Philip Yoe,
By R. J. McCarty
Attorney

No. 851,582. PATENTED APR. 23, 1907.
P. YOE.
VOTING MACHINE.
APPLICATION FILED NOV. 16, 1905.

No. 851,582. PATENTED APR. 23, 1907.
P. YOE.
VOTING MACHINE.
APPLICATION FILED NOV. 16, 1905.

No. 851,582. PATENTED APR. 23, 1907.
P. YOE.
VOTING MACHINE.
APPLICATION FILED NOV. 16, 1905.

No. 851,582. PATENTED APR. 23, 1907.
P. YOE.
VOTING MACHINE.
APPLICATION FILED NOV. 16, 1905.

UNITED STATES PATENT OFFICE.

PHILIP YOE, OF DAYTON, OHIO, ASSIGNOR TO E. W. HANLEY, KERIEN FITZPATRICK, AND PHILIP YOE.

VOTING-MACHINE.

No. 851,582.  Specification of Letters Patent.  Patented April 23, 1907.

Application filed November 16, 1905. Serial No. 287,570.

*To all whom it may concern:*

Be it known that I, PHILIP YOE, a citizen of the United States, residing at Dayton, in the county of Montgomery and State of Ohio, have invented certain new and useful Improvements in Voting-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in voting machines, and relates specifically to means whereby the independent vote is recorded.

The object of my invention is to construct the independent voting mechanism without springs or screws, and every movable part being positively actuated, and so arranged that they may be readily assembled.

In the drawings, which form part of this specification, I have shown parts of my machine other than that of the independent voting mechanism; these parts will be briefly described.

In a detail description of the invention, reference is made to the accompanying drawings, of which—

In a detail description of the invention, similar reference characters indicate corresponding parts.

Figure 1:
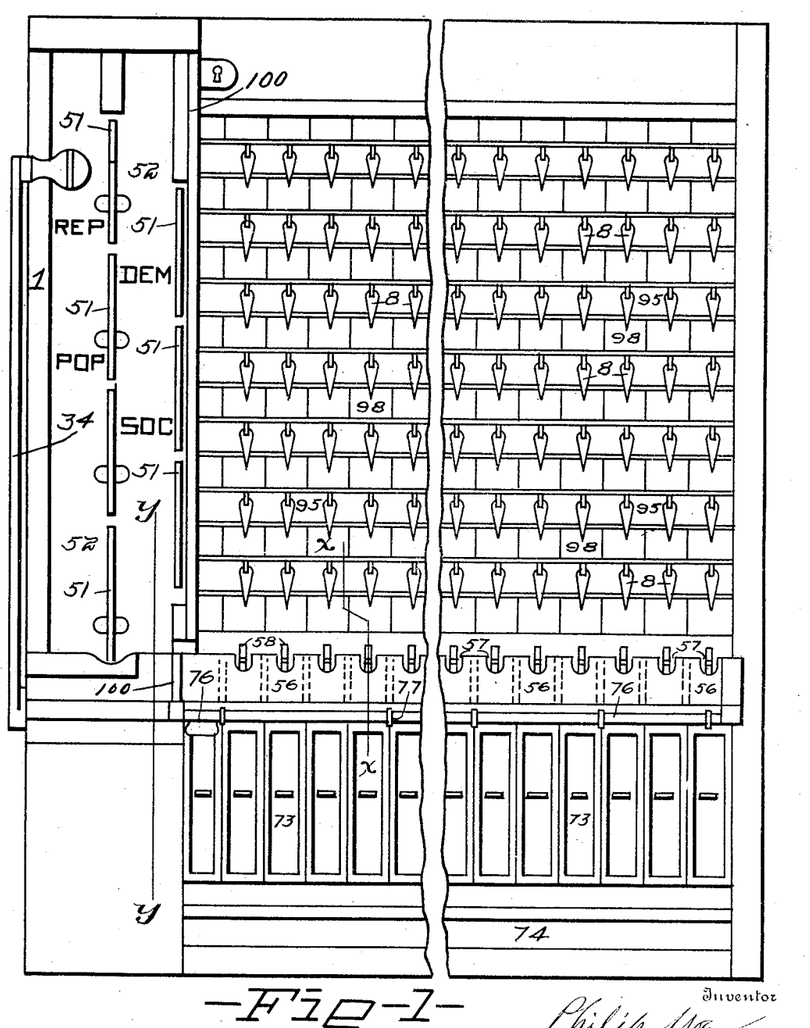
Figure 1, is a front view of my machine.
Figure 2:
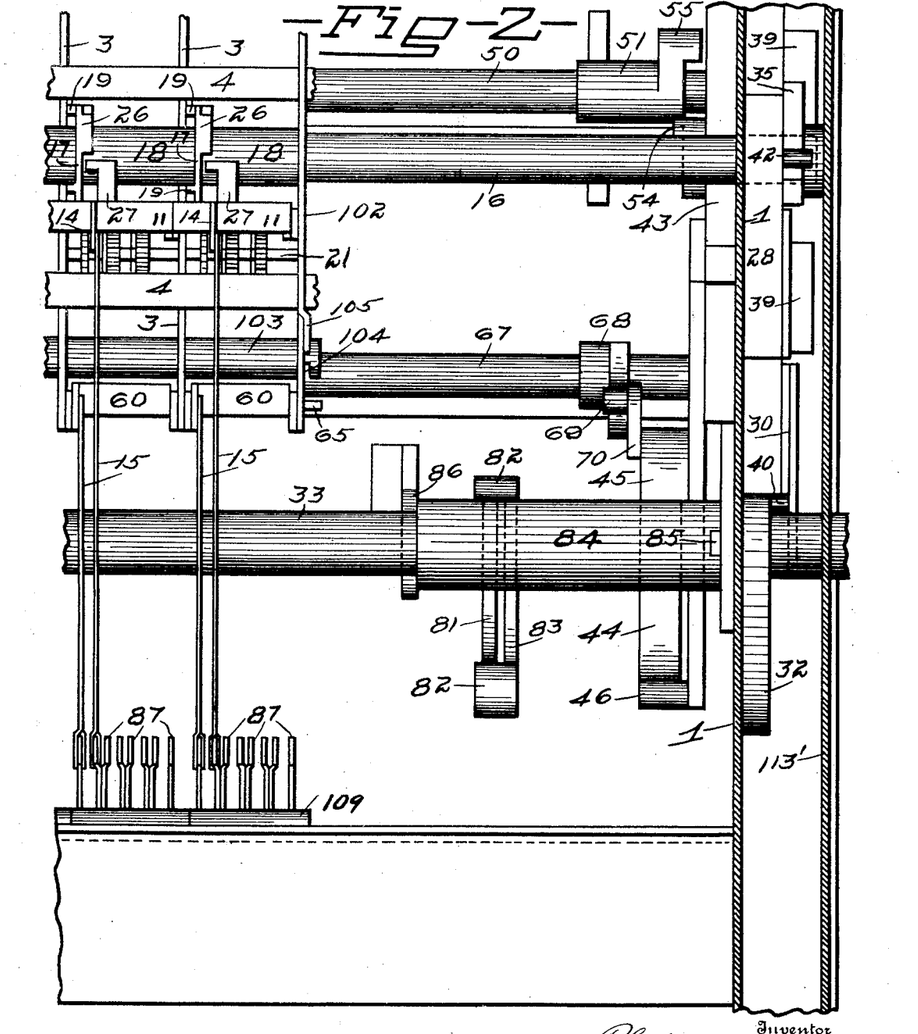
Fig. 2, is a portion of a rear view of my machine.
Figure 16:
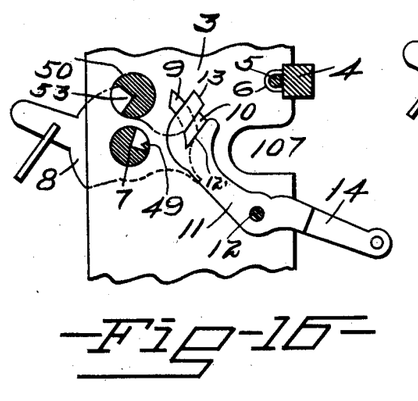
Fig. 16, is a detail of the setting key and actuating frame.

Referring to Fig. 1 on Sheet 1, and Fig. 2, Sheet 2, 1 and 2 respectively, designate the side frames between which are mounted division plates 3; division plates 3 are supported by cross bars 4 which have their bearings in the side frames 1 and 2. Said division plates 3 and cross bars 4 form a multiplicity of divisions between which the counters 22 on shaft 21 are mounted, as shown in Fig. 9, Sheet 6. The cross bars 4 are attached to the division plates 3 by staples 5 and rods 6 as shown in Fig. 16, Sheet 7; the plates 3 rest in slots in the bars 4, said rods pass through holes in the plates 3. The staples 5 hold the rod 6 firmly against the cross bars 4, thereby forming a rigid connection between the cross bars 4 and the division plates 3, and the parts therefor easily assembled. The division plates 3 are further supported by the rod 103' at the top of the machine—see Fig. 13, Sheet 5.

Figure 3:
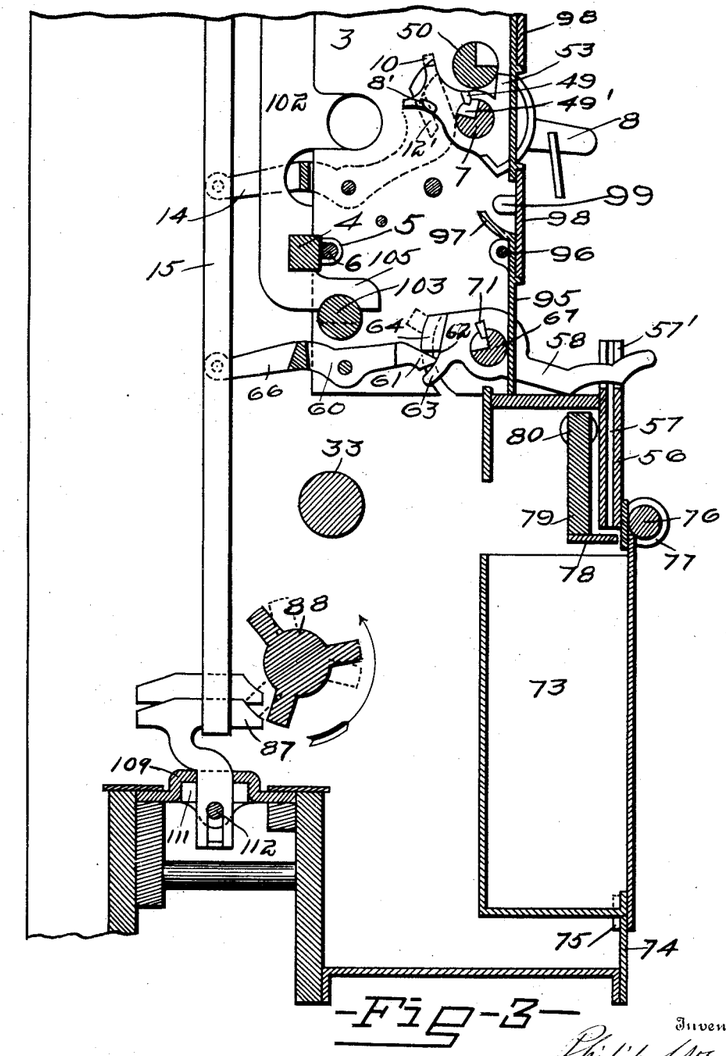
Fig. 3, is a section on the line $x$—$x$ of Fig. 1.
Figure 12:
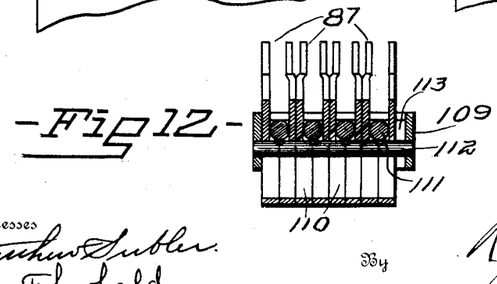
Fig. 12, is a detail of one of the interlocking members.

*Interlocking mechanism:* Extending through the machine and mounted in the side frames 1 and 2 and the division plates 3, are channel shafts 7 upon which are mounted the setting keys 8. Extending from these keys 8 and projecting through curved slots 9 in the division plates 3, are lugs 10 which engage the actuating frames 11, said frames being fulcrumed on rods 12 that extend through the division plates 3. When the setting key 8 is in its normal position or is not set, the lug 10 lies within the cam slot 12' of the frame 11, but upon said key 8 being moved to its set position or depressed, the lug 10 rides out of the cam slot 12' upon the radial surface 13 of the frame 11, see Fig. 16, Sheet 7. When the lug 10 is within the cam slot 12' of the frame 11, and the said frame is locked by means hereinafter described, the key 8 is also locked. Extending from each of the frames 11 is an arm 14 which has connected thereto interlocking rods 15 which actuate interlocking members 87 shown and described in my Letters Patent No. 794,914, of July 18, 1905. A single candidate interlocking mechanism is shown in Fig. 2, Sheet 2; Fig. 12, Sheet 4; Fig. 3, Sheet 3, and Fig. 14, Sheet 7, and briefly described is as follows: Below each vertical series of actuating frames 11 and independent actuating frame 60, is a series or bank of interlocking members 87 which are connected to their respective actuating frames 11 and independent actuating frame 60 by the interlocking rods 15. Each of the interlocking rods 15 has a loop on its lower end by means of which the interlocking members 87 are detachably connected to said rods 15. Each of the single candidate abutment frames 109 contain eight interlocking members 87, seven of these are connected to the actuating frames 11 and one to independent actuating frame 60. The interlocking members 87 each have an enlargement 110 lying on opposite side of rollers 111. Owing to the limited amount of space allotted between the abutments of the abutment frame 109, only one member 87 can be raised at a time. The shaft 112 retains members 87 in their mounted positions.

To comply with the election laws of the State of Illinois, I have constructed the following different denomination interlocking mechanism: Referring to the mechanism illustrated in Fig. 14, Sheet 7, a single ballot may be cast for each of three candidates, or one and one-half for each two candidates, or three ballots for one candidate. It will be noted that the enlargements on the interlocking members 87 in this group are of different dimensions, to-wit—seven being one sixteenth of an inch, seven three-thirty seconds of an inch, and ten three-sixteenth of an inch. The space 113 permits the setting of only the permissible or predetermined number of keys 8 and 58. Arranged in a horizontal line, the name of John Doe will appear in three separate spaces under their corresponding setting keys 8. Upon the ballot board one of the setting keys 8 will stand for one vote, the next for a vote and a half, and the third and final one for three votes, all the other candidates will appear in the same manner on the ballot board. Assuming that one of the enlargements 17$^a$ of the greatest dimension is actuated which counts for three votes, the entire interlocking mechanism of the group will be locked, and no other key can be set. It will be apparent that the space 113 which is three-sixteenth of an inch wide, is sufficient to allow three of the smallest enlargements 17' to be operated, and will only allow two of the medium sized enlargements 17$^b$. It will be observed that the enlargements 17$^c$ of the three independent interlocking members are of the same dimensions as 17$^a$ of the denomination interlocking members. It will be understood that only one ticket orifice 57 will be opened for the entire group The voter will write the name or names and their values upon his card before casting it.

Figure 14:
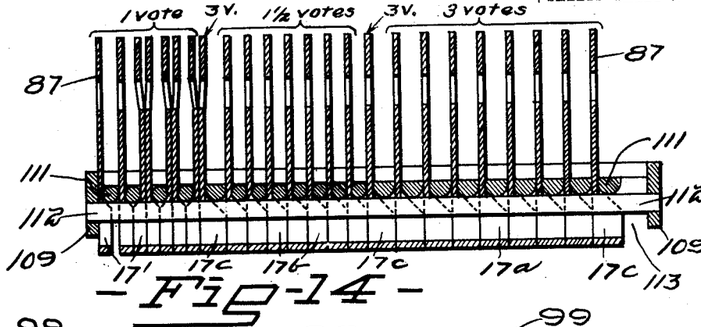
Fig. 14, is a detail of one of the interlocking members for different denomination voting.

It will be understood that the interlocking mechanism shown in Fig. 3, Sheet 3, and Fig. 12, Sheet 4, may be removed from the machine, and the mechanism showing Fig. 14, Sheet 7, substituted. The mechanism shown in Fig. 14, is adapted to displace three of those shown in Fig. 12.

*Independent voting mechanism:* Extending across the lower portion of the machine is a cross frame 56 having orifices 57 into which the cards 57'' for the independent candidates are deposited. Above each orifice 57 is mounted an independent setting key 58—see Fig. 1, Sheet 1, Fig. 3, Sheet 3, and Fig. 8, Sheet 6. These keys 58 are fulcrumed on a channeled shaft 67 which has bearings in the side frames 1 and 2 and the division plate 3. It will be noted from Fig. 3, that it is necessary to raise the key 58 in order to deposit a card 57''. This movement actuates the independent actuating frame 60 as follows: When the independent setting keys 58 are in their normal positions as shown in Fig. 3, Sheet 3, the projection 61 of the independent actuating frame 60 lies within the notch 62 formed by the projection 63 and the radial portion 64 of the keys 58. When a key 58 is raised to the position shown in Fig. 8, Sheet 6, the projection 61 on the frame 60 elevates the outer end 66 of said frame 60, thereby actuating the interlocking mechanism, shown in Fig. 12, Sheet 4. The radial portion 64 of key 58 forms a simple and positive lock for the frame 60 and interlocking members 87 when actuated. It will be understood that about one-sixth of the movement of the key 58 is utilized in actuating the frame 60 and members 87; the remainder of the movement of the key is idle. This excess of movement is necessary to allow the depositing of a card into an orifice and under no circumstance will it allow a card to be deposited until its cooperating interlocking mechanism is securably locked. The weight of the independent actuating frame 60, the interlocking rod 15 and interlocking member 87 will hold the independent setting key 58 in its elevated position by pressing against the radial portion 64 of the key 58. In returning the key 58 to normal position, the projection 63 engages the frame 60 and positively returns said frame 60, interlocking rod 15 and interlocking member 87 to their normal positions. The independent setting keys 58 are returned to their normal positions by a channel shaft 67. Mounted upon said channel shaft 67 is a slotted actuator 68, see Figs. 4 and 5, Sheet 4. This slotted actuator is engaged by a pin 69 on the projection 70 of the frame 43, and when the frame 43 is operated by means hereinafter described, the channel shaft 67 is rocked, and the channel portion of said shaft engages the lug 71 of those keys 58 that have been set in an orifice-opening position as shown in Fig. 8, Sheet 6, thereby resetting the keys 58 to their normal position. When the frame 43 is in the position shown in Fig. 4, the channel portion of the shaft 67 engages all of the lugs 71 of the keys 58 and holds them in their orifice-closing position. In this position, the main operating lever 34 is up and the independent setting keys 58 and setting keys 8 are securely locked by the rotating locking bar 88 hereinafter described.

Mounted below the orifices 57 are card receivers 73 supported on a plate 74; these receivers 73 are held in position on the plate 74 by notched lugs 75, and at the top are locked in position by rod 76, slidingly mounted in rings 77 on bar 56. Immediately below the orifices 57 is a stop plate 78 mounted on the oscillating cross bar 79, said bar 79 being pivoted at 80 on the frames 1 and 2. This bar 79 is given an oscillating motion to allow the cards to be injected into the receivers 73 by the independent setting keys 58 when the operating lever 34 is raised by the voter before he leaves the machine by the following mechanism: Mounted on the main actuating shaft 33 is a cam 81 which engages lugs 82 on the arm 83 on the bar 79. When said shaft 33 is oscillated, the bar 79 recedes from the cross frame 56 and thereby allows any card that may be in the orifices 57 to be injected into the card receivers 73 by key 58. A card cannot be inserted in the orifices 57 when a key 58 is locked or is in its normal position. When a key 58 is in a position shown in Fig. 8, a card being deposited in the orifice, it will be observed that the key 58 cannot be fully returned owing to its coming in contact with the card, therefore, the interlocking mechanism shown in Fig. 12, cannot be unlocked, nor can any one of the setting keys 8 be actuated of this series. The finger recesses 57' in cross-frame 56 forms a convenient means whereby a voter may extract the card from the orifice and change his vote. The cams 44 and 81 are mounted on a sleeve 84 keyed to the main operating shaft 33 by pin 85—see Fig. 2, Sheet 2. The said sleeve 84 is held in contact with this pin 85 by the arm 86 which is mounted in the framework. The card receivers may be constructed in the form of a single drawer with partitions therein, without departing from the spirit of my invention.

Figure 10:
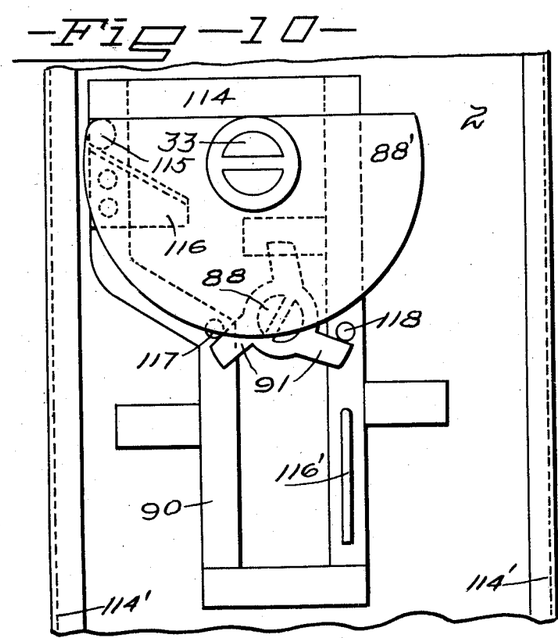
Figs. 10 and 11, details of the interlocking bar actuating frame.
Figure 11:
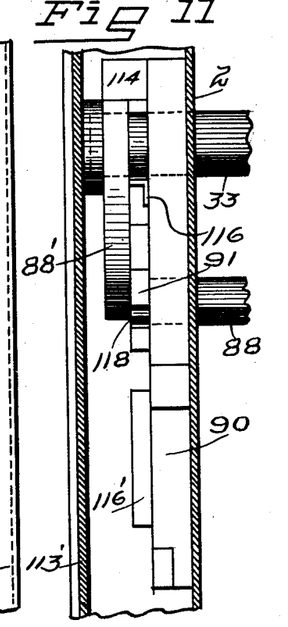

*Rotating locking bar:* Mounted above the interlocking members 87 as shown in Fig. 3, Sheet 3, is a rotating locking bar 88 having three radial vanes or arms. (This locking bar is the subject-matter of another application for Letters Patent and will be briefly described herein.) This bar receives movement from the main operating shaft 33 through the frame 90 mounted on the right hand side of the frame 2, see Figs. 10 and 11, Sheet 6. The frame 90 receives ascending movement from the cam 88' striking the cross bar 114 and descending movement by the pin 115 striking the projection 116. Mounted upon the end of the interlocking bar 88 is a star wheel having arms 91. Upon the ascension of frame 90, the projection 116' strikes the right hand arm 91 and rotates the locking bar 88 from the position shown in full lines in Fig. 3, Sheet 3, to that shown in dotted lines, thereby locking the machine, and upon the descension of said frame, the pin 117 strikes the left hand arm 91 thereby rotating the locking bar 88 from that shown in dotted lines in Fig. 3, to that shown in full lines. The pins 117 and 118 which are on the frame 90, lock the star wheel in the position shown in Fig. 10, Sheet 6, and when said frame 90 is in its upward position, the star wheel is locked by two of its arms 91 engaging the projection 116'. The movement imparted to the rotating locking bar 88 by the frame 90 is substantially as that imparted to the rotating actuating shafts 16 by the frame 28 on the left side of the machine hereinafter described. Thus it will be clearly understood that when the operating lever 34 is raised to the position shown in Figs. 1 and 7, the rotating locking bar 88 will lock all of the interlocking members 87 and their coöperating keys 8 and 58, and by lowering the operating lever 34 the rotating locking bar 88 is advanced and the keys 8 and 58 are unlocked.

Figure 17:
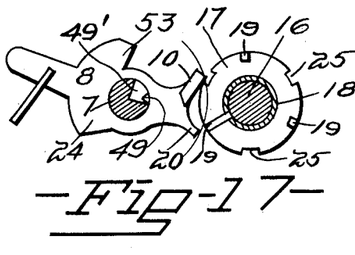
Fig. 17, is a detail of the setting key and counter actuator.

*Individual voting mechanism:* Extending through the machine and through side frames 1 and 2 and the division plates 3, are rotating shafts 16 upon which are mounted counter-actuators 17. These counter-actuators 17 are held in place on shaft 16 by spaces 18. Upon one side of the counter actuators are lugs 19, Fig. 2, Sheet 2, and Fig. 17, Sheet 7, which engage projection 20 on setting keys 8 when any one of said keys 8 is thrown in a voting position and the counter actuator is revolved by means hereinafter described. Mounted between the division plates 3 on rods or shafts 21 are unit counting wheels 22 having ten teeth 23—see Fig. 9, Sheet 6. When the setting key 8 is depressed or set in a voting position, it is positively stopped by the teeth 23 being engaged by the cam surface 24 on said key, and upon the counter actuators 17 being revolved and the lugs 19 engage the ends 20 of the setting key 8; the cam surface 24 depresses one of the teeth 23, revolves the unit wheel 22 to a certain extent, thereby forcing one of the teeth 23 into one of the recesses 25 of the counter actuators 17. The said counter actuators being further revolved and the lugs 19 riding past the ends 20, the recess 25 carries one of the teeth 23 a sufficient distance for the unit wheel of the counters to make one-tenth of a revolution. As two of the teeth 23, of the unit wheel 22, engage the peripheries of the counter actuators 17, the unit wheel is locked except only when one of the teeth 23 enters the notch 25. The counter-actuators 17 are made to revolve one-third of a revolution at each registration. In transferring from unit wheel to tens wheel, and from tens to a hundreds wheel, I employ any well known means. It will be seen that if the setting key 8 is not set, the end 20 will not be thrown in the path of the lugs 19 and the counter actuators 17, and as a consequence, the counters will not be actuated. To prevent the setting keys 8 from being depressed while the counter actuators 17 are revolving, I provide upon said counter actuators, a plurality of ribs 26—see Fig. 9, Sheet 6. Mounted upon each of said actuating frames 11, is a projection 27 which passes under the ribs 26 when a setting key is depressed. If a counter actuator is then revolved, one of the ribs 26 thereon passes in the path of the projection 27, and similarly when the setting key 8 is not depressed, the said rib 26 will pass in the path of the projection 27. It will be seen that in whatever position the setting key 8 is placed, at the beginning of a part revolution of the counter actuator 17, it must so remain until said counter actuator has finished its movement. Mounted upon each of the setting keys 8 is a lug 8′ which enters the recesses between the teeth 23 of the unit counters 22. As the setting keys are locked by means of the ribs 26 and the projection 27 as before described, it will be clearly understood that the counters of all unset keys are locked.

Figure 6:
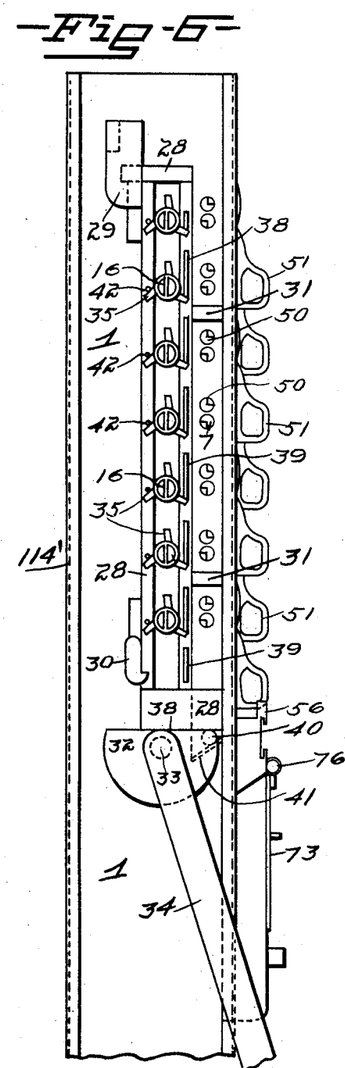
Fig. 6, is a side elevation of my machine.

Mechanism which imparts movement to the rotating shaft 16 upon which the counter actuators 17 are mounted is described as follows: Mounted upon the outside of the frame 1 and having bearings thereon is a reciprocating-actuating frame 28 shown in Fig. 2. Sheet 2, and Figs. 6 and 7, Sheet 12. This actuating frame is held in close contact with the side frame 1 by guides 29–30 and 31. The said reciprocating actuating frame 28 receives reciprocating motion from a cam 32 on the main actuating shaft 33 which has bearings in the side frames 1 and 2. The shaft 33 supports an operating lever 34 by which said shaft is actuated by the voter upon entering and leaving the booth. Fig. 6, shows the position of the lever 34 when the voter is within the booth, and Fig. 7, the position of said lever when the booth is empty. Mounted upon the ends of said shaft 16 are star wheels having three prongs 35 which engage projections 39 and 42 on the actuating frame 28 to rotate the shafts as follows: When the operating lever 34 is raised from the position shown in Fig. 6, to that shown in Fig. 7, the cam surface of the cam 32 rides on the lower surface 38 of the frame 28 thereby raising the same. During this movement, projections 39 on the frame 28, strike the right hand spur or prong 35 of the star wheels, and thereby cause the star wheels engaged to rotate until they reach the position shown in Fig. 7. It will be understood that in this position, there are two of the prongs 35 in contact with the projections 39; this forms a lock for the star wheels or for the shafts 16 through the star wheels, whereby it is impossible for said shafts to rotate from any other cause than that given it by the frame 28. When the operating lever 34 is lowered which occurs when the voter enters the booth, the frame 28 descends as the pin 40 engages the projection 41 on said frame. The pin 40 is on the inner face of the cam 32. In this movement, the pins 42 on the frame 28 strike the adjacent prongs 35 of the star wheels and thereby causes said wheels and the shafts 16 to rotate. The movement given said star wheels when the frame 28 is descending, is not as great as that given said wheels when the frame is ascending. The reason for this is that the counters are actuated when said frame 28 ascends or when the voter leaves the booth, and owing to the spacing of the various elements on the counter-actuators 17, the said actuators work idly during the slight movement given the shafts 16 and the star wheels during the descending movement of the frame 28. This slight movement of the star wheels is necessary to brings the prongs 35 to their original position to be engaged by the projections 39.

As hereinbefore stated, the setting keys 8 are mounted upon channel shafts 7. These shafts are instrumental in returning said keys to their normal or "out of voting" position. The means for actuating said shafts are as follows: Referring to Fig. 2, Sheet 2, Fig. 4, Sheet 4, and Fig. 5, Sheet 4, mounted upon the inner side of the end frame 1, is a key-resetting frame 43 which is given movement by a cam 44 on the main actuating shaft 33, alternately engaging projections 45 and 46 on said frame 43. Mounted upon the frame 43 are pins 47 which engage slotted actuators 48 on the channel shafts 7. Upon the upward movement of the frame 43, said pins 47 engage the upper arm of the slotted actuators 48, thereby rocking the shafts 7.

Figure 4:
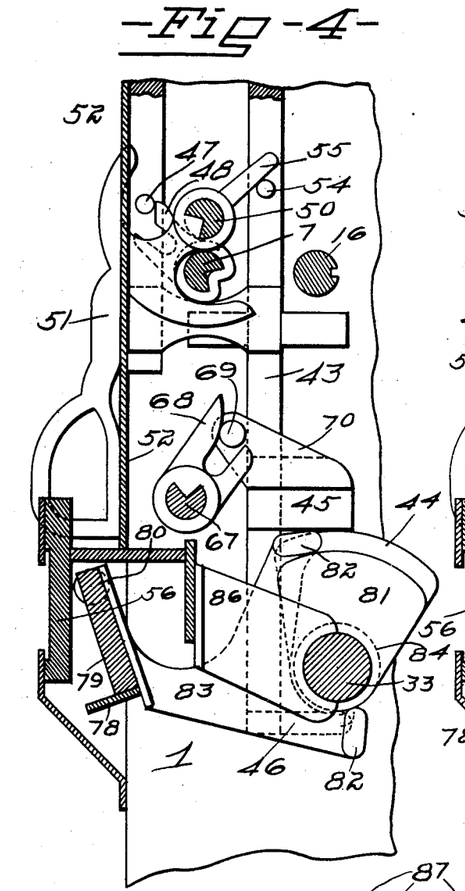
Fig. 4, is a section on the line $y$—$y$ of Fig. 1.
Figure 5:
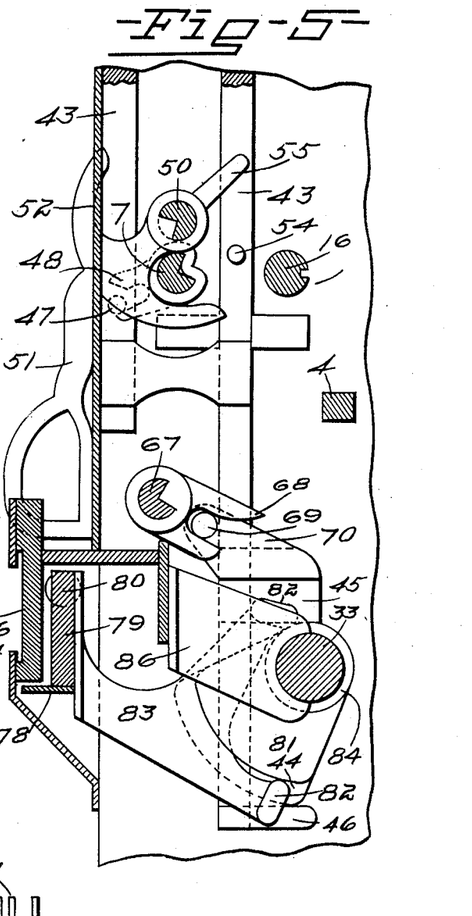
Fig. 5, is a section on the line $y$—$y$ of Fig. 1 in a different position than that shown in Fig. 1.

It will be noted from Fig. 4, Sheet 4, that owing to the construction of the upper arm of the slotted actuators 48, the pins 47 will ride past said arm, this excess of movement is necessary as the frame 43 also resets the straight-ticket setting keys in which a larger movement is required than is required of the individual setting keys, and such excess of movement is utilized to lock the keys 8 as follows: Referring to Fig. 9, Sheet 6, Fig. 17, Sheet 7, and Fig. 3, Sheet 3, 49 designates a lug on the setting keys 8 engaged by the slotted or channeled portion 49′ of the channel shafts 7. Upon said channel shafts being rocked, the keys 8 are carried back to their normal position. When the shafts 7 are in the position shown in Fig. 4, Sheet 4, the channeled portions of said shafts engage the lugs 49, thereby locking the keys in a normal position. In the construction of the machine, I place all the candidate keys for one party in a horizontal line, and the means I employ for voting a straight ticket will now be described. Mounted in the side frames 1 and 2, and extending through the division plates 3, are channel shafts 50. At the left side of the machine and slid upon said channel shafts 50 are straight-ticket setting keys 51—see Fig. 1, Sheet 1, and Figs. 4 and 5, Sheet 4. These keys 51 project through the front casing 52 and are accessible to the voter. In voting a straight ticket, the key 51 is thrown outward; this movement of said key oscillates the channel shaft 50. The channeled portion of said shaft engages the setting key 8 at a point 53, thereby tilting the key from a normal position to a voting position. As all the individual setting keys of one party are engaged by the straight-ticket channel shafts 50 of that party, all the setting keys of that party will be thrown in a voting position, when the straight ticket key of that party is set. In order to return the straight ticket key 51 to its normal position, I provide upon the key-resetting frame 43, pins 54 which engage projections 55 of the straight ticket key 51 when the frame 43 ascends.

Figures 7, 13:
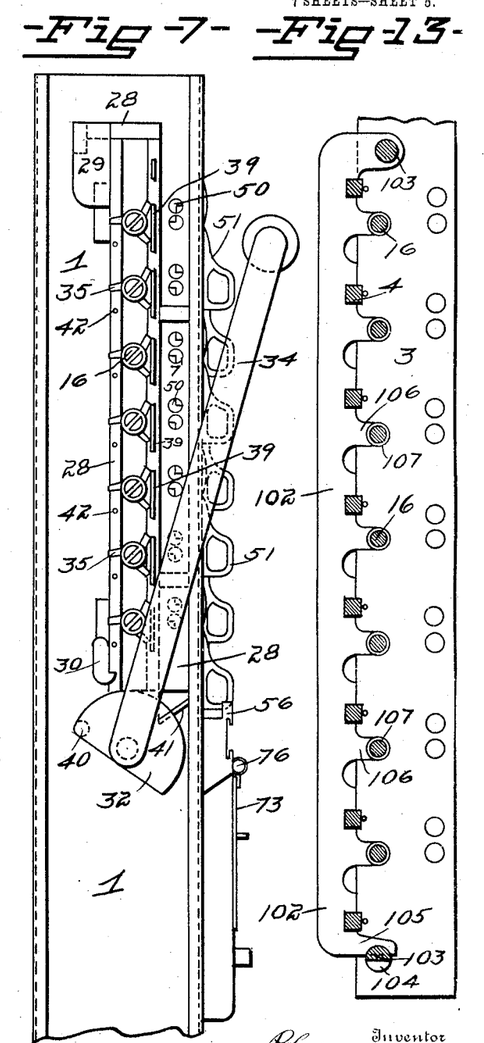
Fig. 7, is a side elevation of my machine in a different position than that shown in Fig. 6.
Fig. 13, is a detail of the split bearing.
Figures 8, 9:
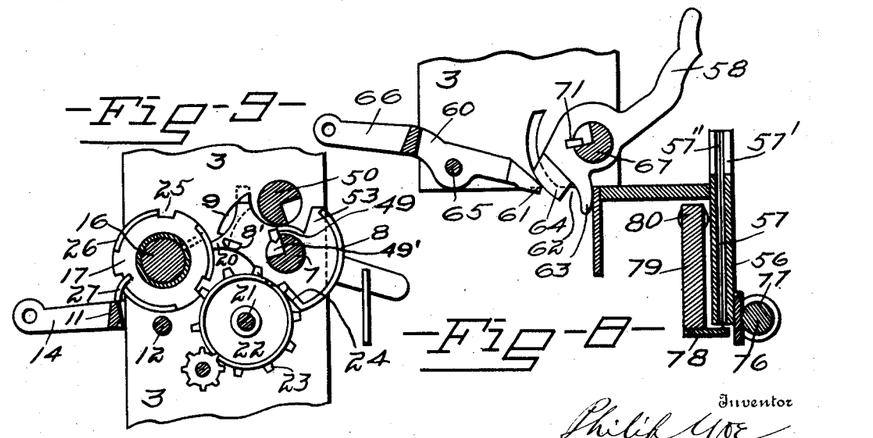
Fig. 8, is a detail of the independent setting key.
Fig. 9, is a detail of the individual setting key counters.
Figure 15:
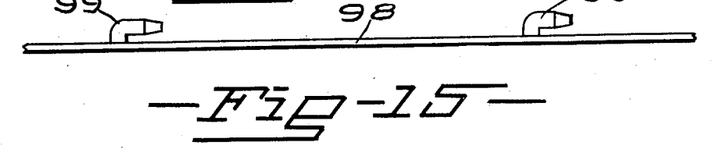
Fig. 15, is a detail view of the plate on which the names of the candidates are exhibited.

Referring to Fig. 13, Sheet 5, 102 designates a plate which forms a split bearing for the rotating counter actuating shafts 16. As the counter actuators 17 form locks for the unit counters 22, it is necessary to provide a yielding bearing for the shafts 16, when the counters are set to zero. The bearing plate 102 is pivoted at the top of the machine on the rod 103', said rod extending through the division plates 3. At the bottom of said plates 102 is a rod 103 which locks all of said plates in the position shown in Fig. 13. This rod 103 has notches 104, which allow the ends 105 of the plates 102 to be thrown into a position to be locked simultaneously. These plates 102 have lateral projections 106 which fit into notches 107 in the division plates 3. The projections 106 and the notches 107 form rigid bearings for the counter-actuating shafts 16, when the plates 102 are locked in position by rod 103. In setting the counters to zero, the plates 102 are unlocked by the rod 103 and thrown outward, thus allowing a yielding movement to the counter-actuators 17 when the counters 22 are rotated to be set to zero. Mounted in the front of each counter between the division plates 3, are plates 95 which are detachably fastened by wires 96—see Fig. 3, Sheet 3; these plates 95 have projections 97, the edges of which are in close proximity to the counting wheels and form a line by which the counters may be easily read. Lying across the machine between the plates 95 is a plate 98 upon which names of candidates are placed. These plates 98 have hooks 99 that engage openings in the division plates 3, see Fig. 15, Sheet 7. The plates 98 and the front casing 52 form the ballot board of the machine. The said plates 98 may be removed to view the counters by unlocking the bar 100, shown in Fig. 1, and giving said plates a movement to the left thereby disengaging them from the division plates 3. The bar 100 also locks the rod 76 of the card receivers. After being unlocked, the bar 100 allows the rod 76 to be removed thereby allowing a removal of the card receivers.

113' shown in Fig. 2, Sheet 2, designates a door which locks all of the oscillating shafts and rods upon which the various mechanisms are mounted. This door 113' may be hinged or mounted to slide as shown in the drawings. In Fig. 2, 114' designates the grooves in which said door slides. There are two of such doors and they provide outer inclosures of the ends of the shafts and rods on two sides of the machine.

I have omitted any illustration or description of the means for compelling a full stroke of the operating lever for the reason that it is not essential; and it forms subject-matter of a separate application.

Having described the structural features and the various movements thereof, I will now briefly describe an operation. The operating lever 34 is in its normal or elevated position as in Figs. 1 and 7. The various keys 8 and 58 are in their normal position and locked. The voter proceeds to the front of the ballot-board and lowers the operating lever 34 to the position shown in Fig. 16. The various keys 8 and 58 are thereby unlocked—the voter then proceeds to make his selection; he can change his selection as often as he desires, or in other words, he is enabled to set or return to normal any of the setting keys 8 without registering them. If the voter desires to cast a vote for a person whose name does not appear on the ballot-board, he writes the name upon the card furnished by the election officials, and raises one of the independent setting keys 58, deposits said card into the orifice of said key 58. If the voter desires to change this vote, he merely withdraws the deposited card and lowers the key 58 to normal position. Before leaving the proximity of the ballot-board, the voter raises the operating lever to its limit, thereby the setting keys 8 are registered on the counters, and the card is positively injected into its receiver by the independent setting key 58, and all of the various keys 8 and 58 are returned to normal and locked and remain locked until the next voter lowers the operating lever 34 into the position shown in Fig. 6.

The setting key and actuating frame mechanism is more fully illustrated and described in Letters Patent issued to myself Feb. 16, 1904, No. 752,276. The registering mechanism as shown and described forms the subject-matter of a pending application Serial No. 274,358. The exclusion mechanism (not shown) is the subject-matter of a pending application, Serial No. 264,084.

The booth or inclosure device (not shown) is illustrated and described in Letters Patent issued to myself May 9th, 1905, No. 789,348.

I am aware that it is old in the art to force a card or ticket holder between the stops of an interlocking mechanism and occupying the allotted spare space, thus preventing the operation of the keys, therefore, I do not claim such a construction.

Having described my invention I claim:

1. In a voting machine, the combination with a frame-work containing a plurality of card orifices, and card receivers below said orifices, of a series of independent-vote keys, movable into orifice-closing positions, said keys when moved to said orifice-closing positions injecting the cards in said orifices into the receivers.

2. In a voting machine, the combination with a frame-work containing a series of card orifices, and a series of card receivers below said orifices, of a movable cross bar controlling the entrances to said card receivers, and a series of independent-vote keys, said keys being adapted to engage the cards in said orifices and to inject said cards into said receivers, said keys and said cross bar being movable simultaneously to open the entrances to the card receivers and to inject cards into said receivers.

3. In a voting machine, the combination with a frame-work containing a series of card orifices, and a series of card receivers below said orifices, of a series of independent-vote keys, means for moving said keys into said card orifices to thereby inject the cards into the receivers, a movable cross bar interposed between said orifices and said card receivers, and means for simultaneously moving said cross bar away from the entrances to the card receivers and for moving said keys into the card orifices.

4. In a voting machine, the combination with a suitable supporting frame, of an oscillating operating lever, a series of independent vote keys, a frame-work extending below and across said keys, said frame-work containing a plurality of card orifices, one of said orifices for each key, card receivers, one for each key, and said keys, when moved engage the cards and inject them into the receivers, a movable cross bar adapted to open and close the entrances to said card receivers, means to actuate said cross-bar, means to return the operating keys to their normal positions by the initial stroke of the operating lever, and means to lock the independent vote keys in their normal positions until the operating lever has reached the limit of its movement in the reverse direction.

5. In a voting machine, the combination with a suitable supporting frame, of a cross frame having a series of card orifices, a card receiver for each orifice, a series of independent vote keys adapted to be moved into and out of orifice-closing positions, an oscillating operating lever, connecting mechanism between said keys and said operating lever, and means to lock said keys in their orifice-closing positions during the initial stroke of the operating lever and to unlock them at the limit of the stroke of the operating lever in the reverse direction.

6. In a voting machine, the combination with a suitable supporting frame, of an oscillating shaft having a longitudinal channel therein, a series of independent vote keys having resetting projections thereon and mounted on said shaft, a cross frame containing a series of card orifices, an operating lever, and connecting mechanism between said oscillating shaft and said operating lever.

7. In a voting machine, the combination with a series of independent-vote keys having resetting projections thereon, an oscillating shaft having a longitudinal channel therein and upon which said keys are mounted, a resetting frame, and an operating lever.

8. In a voting machine, the combination with a series of independent-vote keys, of a series of independent-actuating frames, adapted to be actuated by said keys, interlocking mechanism permitting the operation of one key at a time and actuated by said independent actuating frames, a frame-work having a series of card orifices into which said keys are movable, and a series of card receivers below said orifices and to which the cards are injected by the keys from said orifices.

9. In a voting machine, the combination with an oscillating shaft, a series of independent setting keys mounted on said shaft, an actuator slid on said shaft but prevented from rotating, and a door to prevent said shaft from shifting.

10. In a voting machine, the combination with a rotating counter actuator, of a setting key actuated thereby, a counter actuated by said setting key and said counter actuator, a frame having a plurality of ticket orifices, an irregular-vote key mounted above each ticket orifice and adapted to simultaneously close said orifices and eject a ticket therefrom, a movable cross bar at the exit of said orifice and adapted to receive from all of said ticket orifices when the tickets are ejected therefrom, and an operating lever to actuate said rotating counter-actuator, said irregular vote keys, and said cross bar.

11. In a voting machine, the combination with a rotating counter-actuator, of a regular-vote setting key actuated thereby, a counter actuated by said regular vote setting key and said actuator, a reciprocating frame to actuate said rotating counter actuator, an irregular vote setting key, a frame for resetting said regular and irregular-vote setting keys simultaneously, a frame having a card orifice into which the irregular-vote key is movable to eject cards from said orifice, a card receiver below said card orifice, a movable cross bar arranged between said card orifice and receiver, and means for actuating the reciprocating frame, the resetting frame, and the cross bar.

12. In a voting machine, a series of setting keys, an irregular vote key, interlocking mechanism to prevent the operation of more than one of said setting keys or the irregular vote key, a frame-work having card orifices, a series of card receivers below said orifices to receive the cards ejected from said orifices by said irregular vote key, a movable cross bar interposed between the card orifices and the receivers, and means for actuating said cross bar in and out of the paths of the cards.

13. In a voting machine, the combination with the frame-work thereof, of a series of independent vote keys pivoted to said framework, a cross frame containing a series of card orifices arranged below said independent vote keys, card receivers, means on said independent vote keys for positively injecting cards into said card receivers, and an operating lever and connecting mechanism adapted to actuate said independent vote keys.

In testimony whereof I affix my signature, in presence of two witnesses.

PHILIP YOE.

Witnesses:
R. J. McCARTY,
CAROLYN M. THEOBALD.